US007801110B2

United States Patent
Anjum

(10) Patent No.: US 7,801,110 B2
(45) Date of Patent: Sep. 21, 2010

(54) EFFICIENT DETECTION AND/OR PROCESSING IN MULTI-HOP WIRELESS NETWORKS

(75) Inventor: Farooq M. Anjum, Somerset, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 1189 days.

(21) Appl. No.: 11/095,367

(22) Filed: Mar. 31, 2005

(65) Prior Publication Data
US 2006/0221949 A1 Oct. 5, 2006

(51) Int. Cl.
*H04L 12/28* (2006.01)
(52) U.S. Cl. ............ 370/351; 370/352; 370/353; 370/354; 370/355; 370/356
(58) Field of Classification Search ................ 370/389, 370/400, 237, 255, 338; 709/243, 285, 246, 709/224, 241, 238; 726/3, 23
See application file for complete search history.

(56) References Cited

U.S. PATENT DOCUMENTS

| | | | | |
|---|---|---|---|---|
| 6,104,712 A * | 8/2000 | Robert et al. | ............... | 370/389 |
| 6,970,417 B1 * | 11/2005 | Doverspike et al. | ......... | 370/216 |
| 6,986,161 B2 * | 1/2006 | Billhartz | ....................... | 726/23 |
| 7,035,207 B2 * | 4/2006 | Winter et al. | ................ | 370/225 |
| 7,061,925 B2 * | 6/2006 | Joshi | .......................... | 370/401 |
| 7,082,117 B2 * | 7/2006 | Billhartz | ..................... | 370/338 |
| 7,159,035 B2 * | 1/2007 | Garcia-Luna-Aceves et al. | .......................... | 709/241 |
| 7,280,545 B1 * | 10/2007 | Nagle | .......................... | 370/400 |
| 7,302,704 B1 * | 11/2007 | Elliott | ........................ | 726/22 |
| 2007/0268880 A1 * | 11/2007 | Bellur et al. | ................ | 370/338 |

OTHER PUBLICATIONS

Zhang and Lee, Intrusion Detection in Wireless Ad-Hoc Network, Aug. 2000, MobiComm.*
D. Subhadrabandhu, "Efficacy of Misuse Detection in Adhoc Networks", Secon 2004, p. 1-11, USA.

* cited by examiner

*Primary Examiner*—Curtis Kuntz
*Assistant Examiner*—Phung-Hoang J Nguyen
(74) *Attorney, Agent, or Firm*—Watch Stone P+D, PLLC

(57) ABSTRACT

A multi-hop wireless network system is disclosed that includes a plurality of routing nodes configured to route packets transmitted from a source node to a destination node. In the preferred embodiments, the plurality of routing nodes are configured to perform capture and analysis by only a last routing node before the destination node. Among other things, the system and method provides a efficient method for performing intrusion detection or other processing in a multi-hop wireless network.

14 Claims, 4 Drawing Sheets

○ Routing system nodes

■ Non-routing system nodes

EFFICIENT DETECTION AND/OR PROCESSING IN MULTI-HOP WIRELESS NETWORKS

BACKGROUND

1. Field of the Invention

The present application relates to wireless networking and, in some preferred embodiments, to methods of carrying out intrusion detection and/or other processing in multi-hop wireless networks and/or the like.

2. General Background Discussion

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals. In this disclosure, the terminology network is used broadly and includes individual networks and multiple networks networked together.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Multi-Hop Networking

In a packet-switching network, a hop is the trip a data packet takes from one node (e.g., router or intermediate point) to another node in the network. On the Internet (or another network that uses, e.g., TCP/IP), the number of hops a packet has taken toward its destination (called the "hop count") may be kept in a packet header. Over the Internet and in some other networks, such as, e.g., in some mesh networks or the like, a multi-hop network is employed that may follow a multi-hop path between the source and the destination nodes, such as, e.g., by hopping between routers, etc., along the communication path.

In packet-switched networks such as the Internet, a router can be, e.g., a device or software in a computer that determines the next network point to which a packet should be forwarded to (e.g., to reach is ultimate destination). The router may be, e.g., connected to two or more networks and the router may decide which way to send each information packet based on its current understanding of the state of the network(s) it is connected to. A router can be located at, e.g., a gateway (e.g., where one network meets another). A router can also be included as part of a network switch.

A router may, in some examples, create or maintain a table of the available routes and their conditions and use this information along with, e.g., distance and cost algorithms to determine the best route for a given packet. In some common examples, a packet may travel through a number of network points with routers before arriving at its destination. Routing is typically a function associated with the network layer (i.e., layer 3) of the OSI model. In that regard, a layer-3 switch is a switch that can perform routing functions.

Intrusion Into Wireless Networks

The present inventor has determined that in wireless multi-hop networks marked by, e.g., resource constrained devices there is a need to perform certain capture and analysis and other processes efficiently, such as, e.g., to perform intrusion detection, to perform compression and/or decompression, etc. The efficiency aspect of this can address not only the incapability of certain devices to perform this processing but can also address the overheads associated with such processing if done redundantly.

In contrast to wireline networks, wireless networks have substantially different constraints and conditions. In the context of wireline networks, capture of packets and their analysis can be done at a gateway which is a point at which traffic enters and/or leaves the enterprise network. Such a chokepoint might not exist for wireless networks. Further, wireline networks do not have similar constraints on resources such as, e.g., processing power, bandwidth, memory, etc., as are confronted by wireless networks, rendering solutions for wireless networks to have significantly different requirements and considerations.

A few illustrative existing systems and methods to perform intrusion detection are described in the following references:

1) Zhang and Lee, "Intrusion Detection in Wireless Ad-Hoc Networks," Mobicom 2000;
2) Marti S., Guili T., Lai K. and Baker M., "Mitigating Routing Misbehavior in Mobile Ad Hoc Networks," Mobicom 2000; and
3) Subhadrabandhu D. Sarkar S and Anjum F., "Efficacy of Misuse Detection in Adhoc Networks," Secon 2004.

Nevertheless, the systems and methods described in these references a) fail to achieve efficient solutions and/or b) assume other factors such as promiscuous monitoring. In addition, the present inventor has determined that wireless networks have other associated resource constraints and that it is not practical to use solutions that require inefficient resource usage, such as, e.g., in the above references.

With respect to references 1) and 2), it can be seen that these references require that every node in the system capture and analyze all packets. Thus, with the systems and methods of these references 1) and 2), a packet transmitted between a source and a destination will be analyzed N times if there are N nodes between the source and destination.

With respect to reference 3), the reference describes a system that works only in a promiscuous mode. In this regard, in a promiscuous mode, a network device intercepts and reads each network packet that arrives in its entirety. Once again, in reference 3), more than one node can analyze a packet.

While a variety of systems and methods are known, there remains a need for improved systems and methods.

SUMMARY OF THE PREFERRED EMBODIMENTS

The preferred embodiments of the present invention can significantly improve upon existing methods and/or apparatuses. Among other things, the preferred embodiments can provide improved mechanisms to perform one or more of the following and/or other processes in wireless networks: a) intrusion detection; b) processing of data; c) decryption; d) encryption; e) unwrapping of packets; f) analysis of data; g) and/or other processes or the like, and, in some of the more preferred embodiments, mechanisms are provided that enhance efficiency in resource constrained wireless multi-hop networks.

The preferred embodiments can greatly improve efficiency by performing capture and analysis at only a single node. With the preferred embodiments, a highly efficient solution can be achieved that will efficiently and easily ensure that every packet is only processed once.

With the preferred embodiments, there is a substantial reduction in usage of resources (such as, e.g., power, memory, processing power, etc.). In contrast to other solutions, this reduction in resource usage can be, e.g., a reduction by a factor of 1/N for every packet where N is the number of nodes that a packet traverses between the source and the destination.

According to some embodiments of the invention, a multi-hop wireless network system is provided that includes: a plurality of routing nodes configured to route packets transmitted from a source node to a destination node; and the plurality of routing nodes being configured to perform capture and analysis by only a routing node proximate the destination node.

In some examples, the routing nodes are configured to check a destination address of a packet and to compare if such destination address matches a next hop address. In some examples, the routing nodes are configured to perform capture and analysis if the destination address matches the next hop address. In some other examples, the routing nodes are configured to perform intrusion analysis if the destination address matches the next hop address, and, e.g., to drop a packet if the analysis determines that the packet is abnormal, and, e.g., to forward the packet to the destination node if the analysis determines that the packet is normal. Preferably, the routing node proximate the destination node is a last routing node before the destination node. In some illustrative examples, the multi-hop wireless network is located within an enterprise, a building or a home, and in some examples, the multi-hop wireless network is a mesh network.

According to yet some other embodiments of the invention, a method for efficient processing in a multi-hop wireless network system is provided that includes: routing packets received from a source node via a plurality of routing nodes configured to wirelessly route packets toward a destination node; and performing capture and analysis of the packets at only one of the routing nodes prior to transmission to the destination node.

According to yet some other embodiments, a wireless routing node for a multi-hop wireless network is provided that includes: the wireless routing node being configured to check a destination address in a packet transmitted from a source to a destination and wirelessly routed via the wireless routing node; and the wireless routing node being configured to perform capture and analysis of the packet only if the destination address matches a next hop address. In some preferred embodiments, the analysis involves intrusion detection, and the wireless routing node is configured to transmit the packet to the destination only if the intrusion detection analysis determines that the packet is normal.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

Figure 1:
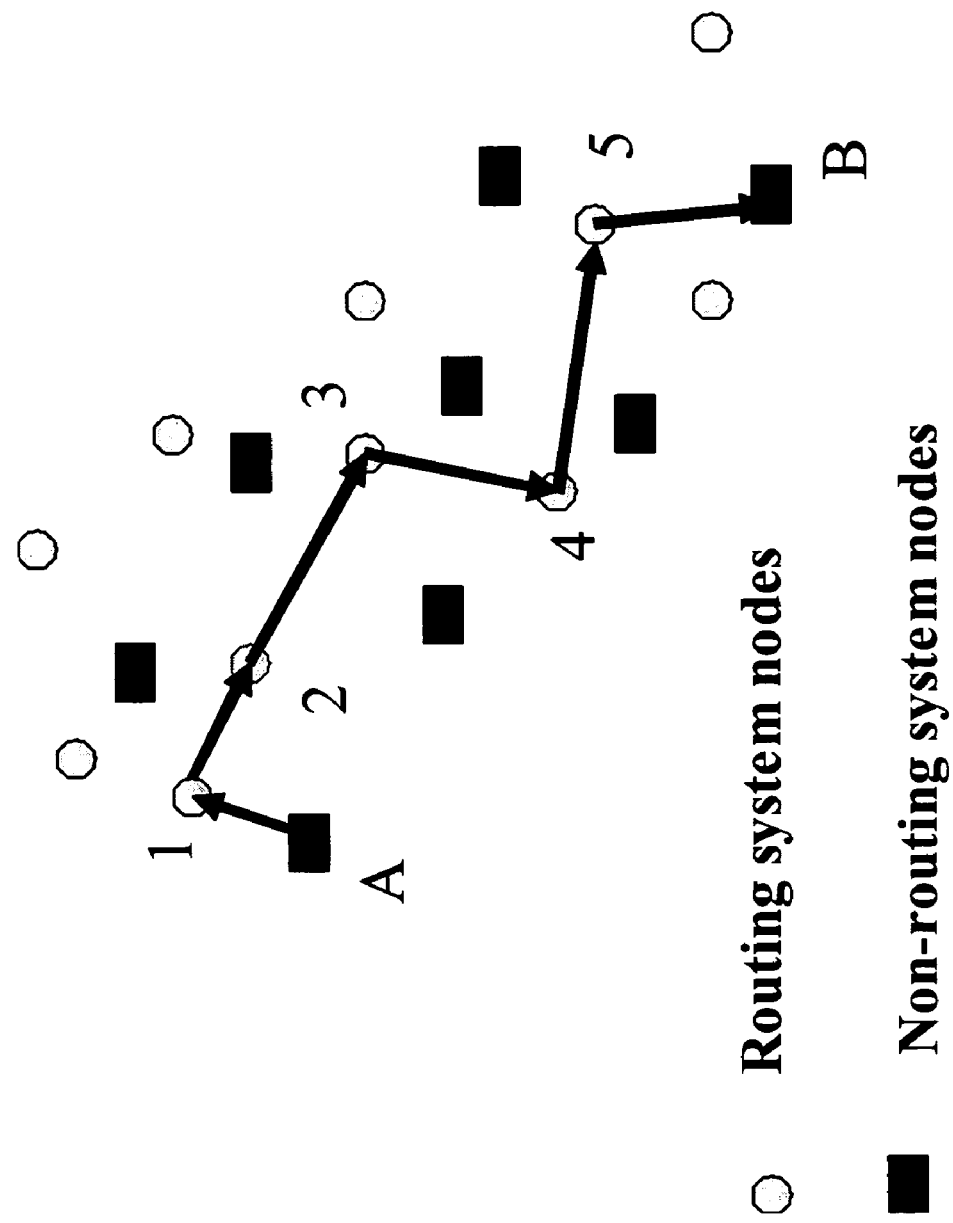
FIG. 1 is an architectural diagram illustrating a routing path through a multi-hop wireless network according to some illustrative embodiments of the invention.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Introduction to the Preferred Embodiments

The preferred embodiments can provide, among other things, improved mechanisms to perform one or more of the following and/or other processes in multi-hop wireless networks: a) intrusion detection; b) processing of data; c) decryption; d) encryption; e) unwrapping of packets; f) analysis of data; g) and/or other processes or the like, and, in some of the more preferred embodiments, mechanisms are provided that enhance efficiency in resource constrained wireless multi-hop networks.

The preferred embodiments of the present invention can be implemented within a variety of networks employing multi-hop routing communications. For example, applicable networks can include wireless LANs (WLANs), infrastructure WLANs, independent WLANs, mesh networks, adhoc networks (such as, e.g., in military or disaster ad hoc implementations) and/or a variety of other networks employing multi-hop wireless communications, including, e.g., private networks within enterprises, public networks such as, e.g., those connected to Internet, and/or the like.

The preferred embodiments provide systems and methods for efficiently using resources in a wireless network employing such multi-hop communications. In this disclosure, the terminology wireless network includes any network employing at least some wireless communications to or from at least one network node. In particular, the preferred embodiments can provide systems and methods for efficiently using resources in a multi-hop wireless network. Among other things, the preferred embodiments can improve intrusion detection processing techniques and other processing and analyses carried out in multi-hop wireless networks.

According to some preferred embodiments of the invention, only a limited number of network nodes, and in the most preferred embodiments only one network node, will analyze a packet, such as, e.g., for performing intrusion detection analyses and/or other analyses. In the most preferred embodiments, the last routing node will analyze the packet.

In contrast to, for example, reference 3) discussed above, the preferred embodiments can be implemented to operate in both a promiscuous mode and/or a non-promiscuous mode. In this regard, a non-promiscuous mode is the opposite of a promiscuous mode described above. As described above, in a promiscuous mode, a network device typically intercepts all packets including those not intended for the node in question and reads each network packet that arrives in its entirety. When a data packet is transmitted in a non-promiscuous mode, devices essentially listen to the data to determine if the network address included in the data packet is theirs. For example, a node or device may read header information in the packet to identify the destination address, while not capturing or analyzing the content of the data packet. If the destination address is not associated with that node or with a device associated with that node, the data packet is passed onto the next device until the device with the correct network address is reached. That correct device will then receive and read the actual data. In this manner, a node can easily determine if it is the last routing node within a network path. For example, in order to determine if the node is the last routing node within a network path, it can compare the destination address with an address list of devices associated with that node.

According to some of the embodiments of the invention, attacks on devices in wireless networks may be advantageously detected by, for example, signature based techniques which are a form of, e.g., pattern matching. See, e.g., the above references 1), 2) and 3), the entire disclosures of which are incorporated herein by reference. In order to do this, one can capture the packets being transmitted and then analyze them for abnormalities and/or deviations from a normal. However, the present inventor has determined that having numerous nodes or all of the nodes perform such analyses along a multi-hop path of a packet is not an efficient solution.

According to some preferred embodiments of the invention, a system and method are provided that perform such capture and analysis at only a limited number of nodes, such as, e.g., at less than a few nodes, and, most preferably, at only a single node.

In various examples, determination of a single node for such capture and analysis can be done in a variety of ways. However, due to, among other things, the mobility within a wireless network, link dynamics, etc., in some preferred embodiments, an efficient and optimal method for capture and analysis (such as, e.g., for detecting intrusions) in wireless networks is employed in which the last routing node within a multi-hop path will perform such capture and analysis.

The Illustrated Embodiments

FIG. 1 shows an illustrative, and non-limiting, wireless multi-hop network (which may involve, e.g., in an individual wireless multi-hop network or a system of wireless multi-hop networks) in which some of the nodes participate in routing and, hence, form part of the routing system, while other nodes may not participate in routing. When a source wants to send packets to a destination, then each packet will be forwarded by routing system nodes until the packet reaches the last routing system node before the destination. In some embodiments, the nodes that participate in routing may vary based on circumstances or based on the identities and/or locations of the source or destination nodes. In the illustrative embodiment shown in FIG. 1, nodes that may participate in routing are identified by rectangles, while non-routing system nodes are identified by circles.

In the illustrative example shown in FIG. 1, a packet is transmitted by a source A to a destination B in a multi-hop wireless network or system of networks. In the illustrative example shown, a packet transmitted by the source A to the destination B is forwarded by nodes 1, 2, 3 and 4 without the nodes performing any analyses upon the packet. In the preferred embodiments, however, the last routing system node (i.e., node 5) will capture and analyze the packet before delivery to the destination node B.

In order to effect this capture and analysis at the last routing system node, the routing system nodes (such as, e.g., those nodes identified by a circle in FIG. 1) are preferably configured to check the packets to determine if the packet destination address equals the next hop address. If a match exists, the node can analyze the packet, such as, e.g., to unwrap the packet content and evaluate the packet for abnormalities that evidence intrusion and/or to perform other analyses. As indicated above, any known algorithms or techniques may be employed in conducting such analyses, such as, e.g., known techniques such as, e.g., anomaly detection and misuse detection. See, e.g., the references incorporated herein by reference above. Preferably, the routing system nodes are configured such that if the packet is found to be abnormal during such an analysis, the node drops the packet. Otherwise, if the node does not determine that the packet is abnormal, the node will preferably forward the packet to the destination.

Although not depicted in FIG. 1, in some embodiments, the source and/or the destination nodes could be configured to perform routing functions. Accordingly, the source and/or the destination nodes could be configured to operate as part of the routing system, such as, e.g., when such nodes are not the particular source or destination nodes of a particular communication. Similarly, while in the preferred embodiments the last routing node prior to the destination node can perform analyses, in some other embodiments, another node can be made to perform such analyses. As one example, in the event that the last routing node has limited resources, the system can potentially be configured to have another node perform such analyses. As another example, in some embodiments, the destination node itself could potentially be configured to perform such analyses.

Figure 2:
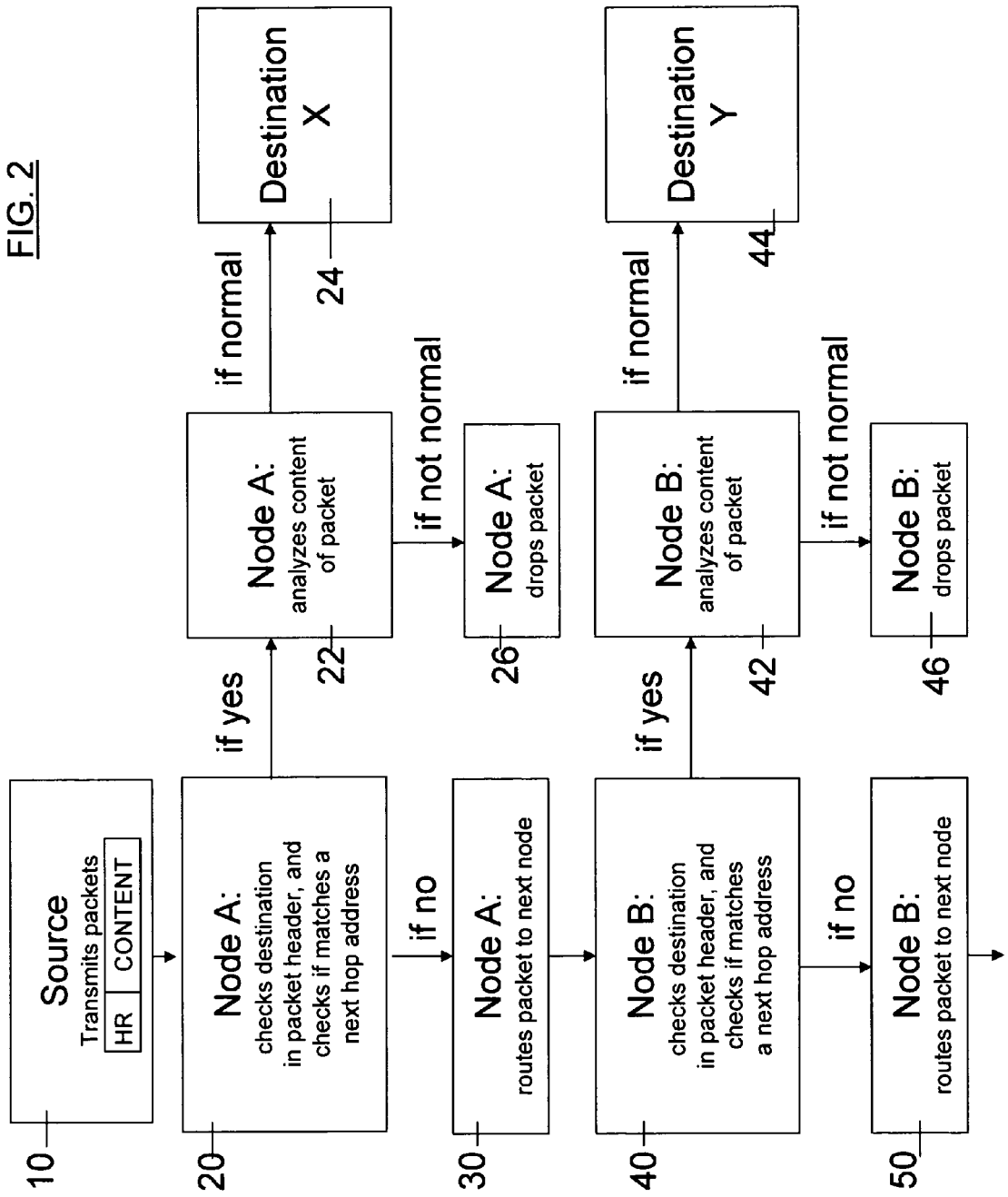
FIG. 2 is a flow diagram illustrating process steps carried out according to some illustrative embodiments of the invention.

FIG. 2 is a flow diagram that illustrates process steps that can be carried out according to some illustrative embodiments of the invention during routing of a packet. As shown, at a first step 10, a source node transmits a packet, including header HR and content data as illustrated. As step 20, a node A, such as, e.g., a router or other transceiver device capable of routing packets receives the packet and checks the destination address, and compares if the destination address matches a next hop address. If there is a match, the node A analyzes the content of the packet at step 22. If the packet is normal, the node A then delivers the packet to the destination node X at step 24. But, if the packet is determined to be abnormal, the node A drops the packet at step 26. On the other hand, if there is no match, the node A routes the packet to the next node at step 30.

Similarly, when the packet is received at node B, at step 40 node B checks the destination address and compares if the destination address matches a next hop address. If there is a match, the node B analyzes the content of the packet at step 42. If the packet is normal, the node B then delivers the packet to the destination node Y at step 44. But, if the packet is determined to be abnormal, the node B drops the packet at step 46. On the other hand, if there is no match, the node B continues to route the packet to another subsequent node (not shown) to continue the transmission until the destination address is reached. In this regard, subsequent routing nodes can perform similar functionality to that of nodes A and B.

As indicated above, embodiments of the present invention can be employed within a wide variety of networks. The preferred embodiments can provide a resource efficient solution that can work under a wide variety of scenarios. By way of example, FIGS. 3 and 4 illustrate a few other illustrative and non-limiting exemplary network scenarios within which embodiments of the present invention may be implemented.

Figure 3:
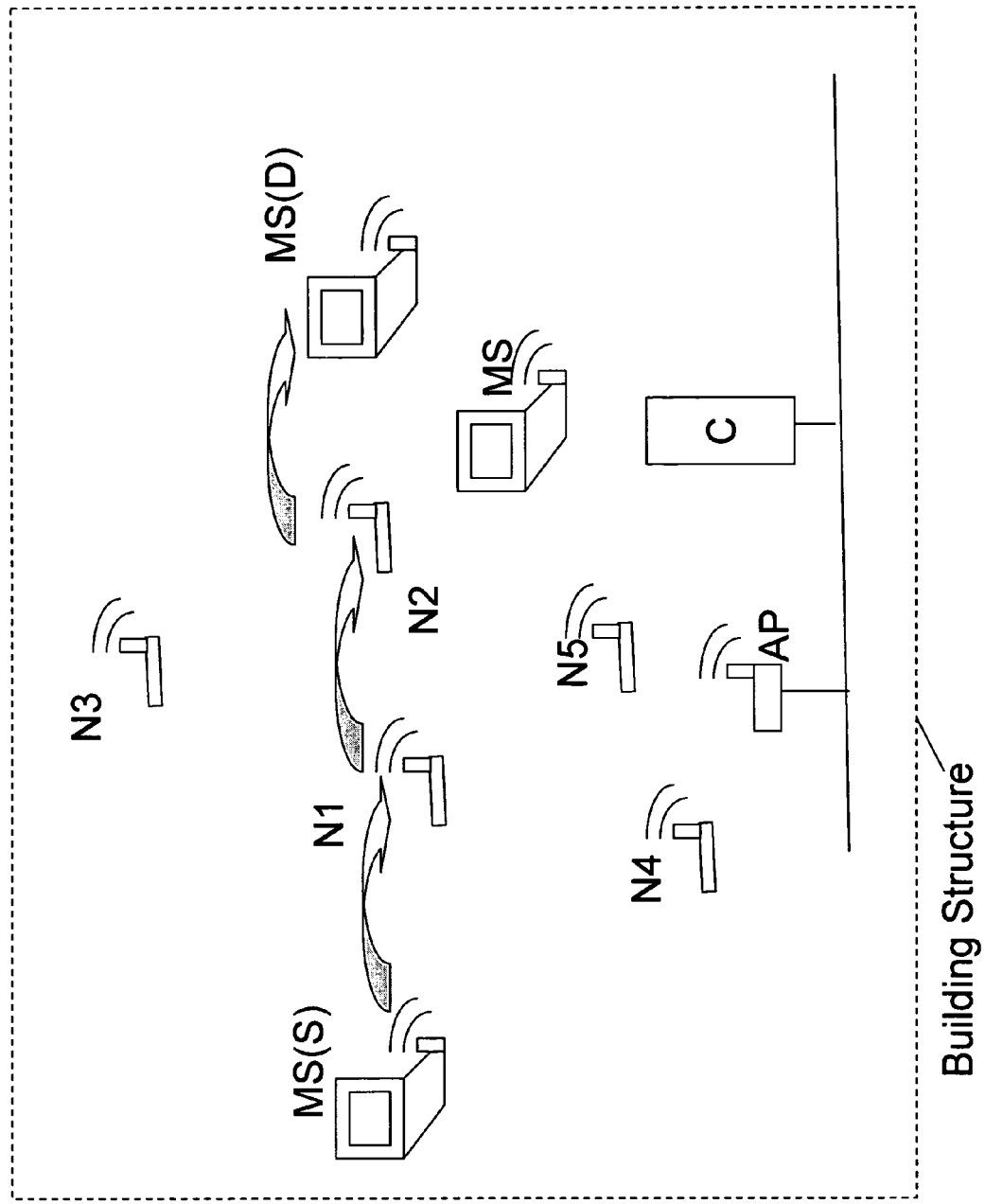
FIG. 3 is an architectural diagram depicting an illustrative network in which aspects of the present invention may be employed.
Figure 4:
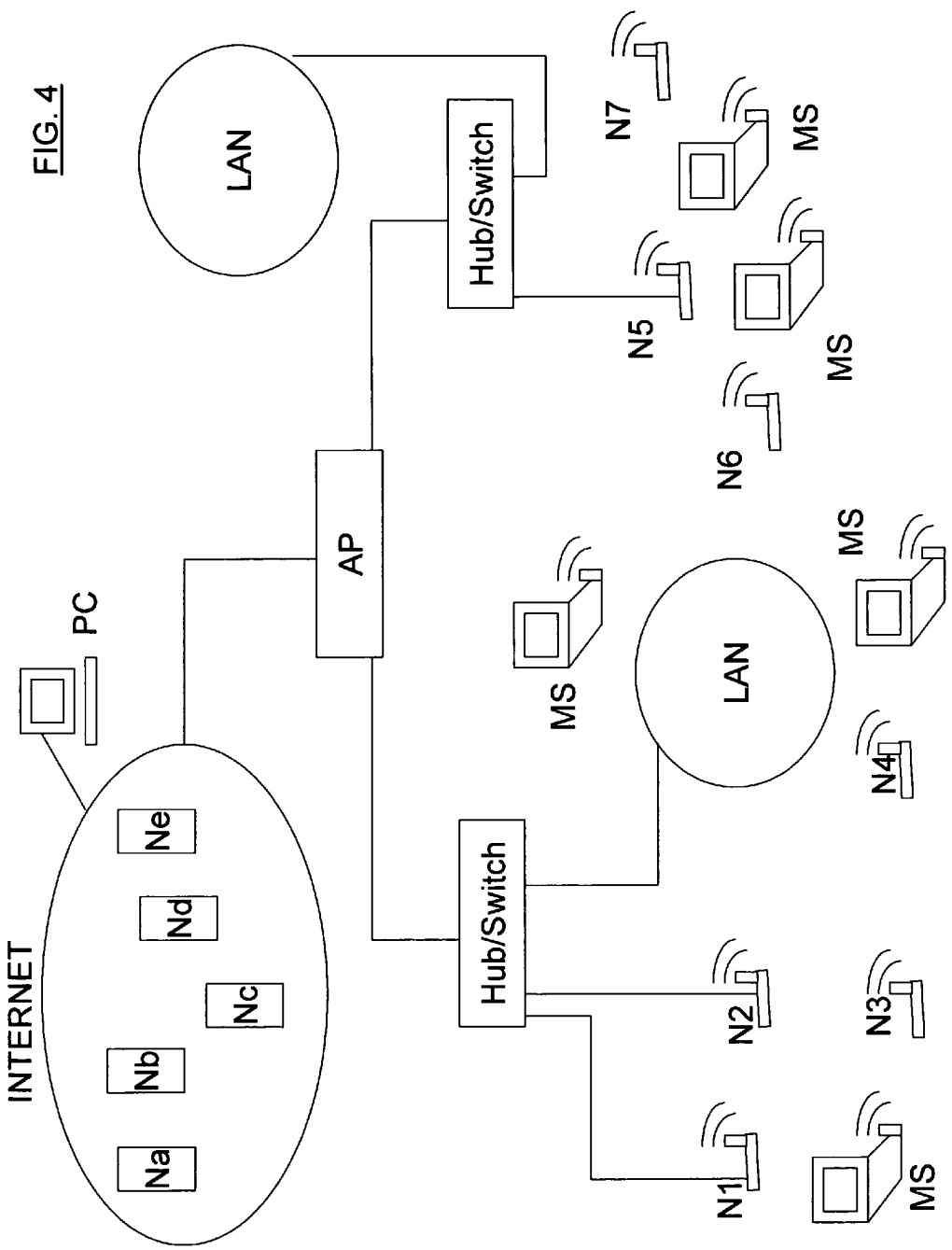
FIG. 4 is an architectural diagram depicting another illustrative network in which aspects of the present invention may be employed.

With reference to FIG. 3, for example, an exemplary network is shown which can include, e.g., an access point AP connected to a wired network, including, e.g., at least one computer or computer system C, and a plurality of routing nodes N1, N2, N3, N4 and N5, which can include, for example, access points operating as repeaters or other transceiver devices adapted to perform wireless routing functions. In some embodiments, the system in FIG. 3 could be part of a mesh network as described below.

In one illustrative implementation, as shown in FIG. 3, upon transmission of a message from a source mobile station MS(S) toward a destination mobile station MS(D), the transmission can pass from a first node N1 to a second node N2, which second node can, e.g., perform appropriate analyses, such as, e.g., to run intrusion detection algorithms or other analyses. As also shown in FIG. 3, in some embodiments, the system and method can be employed within a network that is substantially contained or located within a business facility or site region or location, such as, e.g., within a specific building structure as shown schematically with dashed lines in FIG. 3.

In addition, although the example shown in FIG. 3 depicts a communication (e.g., such as an intrusion) from a source internal to the illustrated network, in some embodiments, aspects of the present invention can be employed to analyze communications that originate from outside of a WLAN network, such as, e.g., from over the Internet or the like.

FIG. 4 shows another illustrative and non-limiting example implementation within a large infrastructure WLAN system having, among other things, a plurality of LANs connected to the Internet via an access point AP. By way of example, the nodes N1, N2, N3, N4, N5, N6 and N7 in this example could be adapted to operate as routing nodes incorporating features of the routing nodes according to embodiments of the present invention.

Thus, in various embodiments, advantages achieved can be useful in a variety of environments, such as, e.g., for use by companies, by organizations, by families and/or by individuals. The preferred embodiments have particular applicability and benefit in multi-hop wireless networks, such as, e.g., for mesh networks, military networks, such as, e.g., Department of Defense (DoD) networks, in which ad hoc networks are established under conditions without underlying infrastructure, and/or other appropriate wireless networks.

With respect to mesh networks, such networks can include, e.g., an architecture for wireless LANs in which, e.g., instead of moving data merely from a device to a wireless access point to a wired network, a mesh network moves data from, e.g., an access point to an access point (such as, e.g., depending on availability and proximity). Typically, the data then eventually moves onto a wired network. Mesh network traffic can flow in a generally similar way to how data travels across multiple points on the Internet before reaching a final destination (such as, e.g., schematically illustrated in FIG. 3).

In some embodiments, a mesh network could work like a peer-to-peer network, where devices both send their own data and forward data on for other devices. With a mesh network, a business establishment, a home, and/or the like only has to provide power, not a data cable, to many or most of the access points. The data is then transmitted wirelessly from one access point or node to another until one of the access points finally ties into the hard-wired network. See, e.g., FIG. 3, discussed above. This wireless networking technique can be useful, for example, in building structures where cable can be costly to install, in remote locations, and/or in a variety of other environments.

In some embodiments, wireless nodes employing routing functionality as described herein can involve a variety of devices now or later known in the art, such as, e.g., as discussed above, Access Points, routers, and/or other appropriate transceiver devices. In addition, such nodes can include, inter alia, any appropriate antenna structures, such as, e.g., omni-directional antennas, directional antennas, etc. By way of example, directional antennas can include, e.g., phased antenna systems (e.g., systems where electromagnetic fields effectively add in some directions and cancel in other directions to provide a directional distribution), reflector grid directional antennas, yagi directional antennas, polarized directional antennas and/or any other now or later known directional antennas. As other examples, some embodiments could incorporate antennas that can change their beamforming patterns, such as, e.g., by way of example, using techniques such as, e.g., Adaptive Array steered by Local Phase Shifters (AA-LPS), such as described in U.S. Pat. No. 6,249,249 (entitled Active Array Antenna System) and/or U.S. Pat. No. 6,466,165 (entitled Adaptive Array Antenna), the entire disclosures of which patents are incorporated herein in their entireties. In addition, in various embodiments with multiple routing nodes, the various routing nodes can include a variety of different types of devices, which devices can each employ a variety of different types of antennas, such that, by way of example, the last routing node can potentially constitute a node that receives a transmission from any appropriate type of antenna (e.g., omni-directional, directional, etc.) and/or can potentially constitute a node that transmits a signal with any appropriate type of antenna (e.g., omnidirectional, directional, etc.). Among other things, some of the preferred embodiments described herein can be particularly advantageous in the context of networks having system components with directional antennas and with system components that operate in a promiscuous mode.

Illustrative Advantages and Benefits

As discussed above, the preferred embodiments can provide, among other things, improved mechanisms to perform one or more of the following and/or other processes in wireless networks: a) intrusion detection; b) processing of data; c) decryption; d) encryption; e) unwrapping of packets; f) analysis of data; g) and/or other processes or the like, and, in some of the more preferred embodiments, mechanisms are provided that enhance efficiency in resource constrained wireless multi-hop networks.

The preferred embodiments can greatly improve efficiency by performing capture and analysis at only a single node, and, most preferably, only at the last routing node. With the preferred embodiments, a highly efficient solution can be achieved that will efficiently and easily ensure that every packet is only analyzed once.

With the preferred embodiments, there is a substantial reduction in usage of resources (such as, e.g., power, memory, processing power, etc.). In contrast to other solutions, this reduction in resource usage can be, e.g., a reduction by a factor of 1/N for every packet where N is the number of nodes that a packet traverses between the source and the destination.

Accordingly, with the various preferred embodiments of the invention, very efficient intrusion detection and/or other processing can be readily implemented in a variety of multi-hop wireless networks.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A multi-hop wireless network system, comprising:
   a) a plurality of routing nodes configured to route packets transmitted from a source node to a destination node;
   b) said plurality of routing nodes being configured to perform capture and analysis of said packets by only a routing node proximate the destination node;
   c) wherein said routing nodes are configured to check a destination address of a packet and to compare if such destination address matches a next hop address;
   d) wherein said routing nodes are configured to perform capture and analysis if said destination address matches said next hop address; and
   e) wherein said routing nodes are configured to drop a packet if said analysis determines that said packet is abnormal and to forward the packet to said destination node if said analysis determines that said packet is normal.

2. The multi-hop wireless network system of claim 1, wherein routing nodes are configured to perform intrusion analysis if said destination address matches said next hop address.

3. The multi-hop wireless network system of claim 1, wherein said routing node proximate the destination node is a last routing node before the destination node.

4. The multi-hop wireless network system of claim 1, wherein said multi-hop wireless network is located within an enterprise, a building or a home.

5. The multi-hop wireless network system of claim 1, wherein said multi-hop wireless network is a mesh network.

6. A method for efficient processing in a multi-hop wireless network system, comprising:
   a) routing packets received from a source node via a plurality of routing nodes configured to wirelessly route packets toward a destination node;
   b) performing capture and analysis of said packets at only one of said routing nodes prior to transmission to the destination node;
   c) further including having said routing nodes check a destination address of a packet and compare if such destination address matches a next hop address;
   d) further including having routing nodes perform capture and analysis if said destination address matches said next hop address; and
   e) further including having said routing nodes drop a packet if said analysis determines that said packet is abnormal and having said routing nodes forward the packet to the destination node if said analysis determines that said packet is normal.

7. The method of claim 6, further including having said routing nodes perform intrusion analysis if said destination address matches said next hop address.

8. The method of claim 6, further including providing said multi-hop wireless network within an enterprise, a building structure or a home.

9. The method of claim 6, further including providing said multi-hop wireless network as an 802.11 wireless network.

10. The method of claim 6, further including providing said multi-hop wireless network as a private network.

11. A wireless routing node for a multi-hop wireless network, comprising:
   a) said wireless routing node being configured to check a destination address in a packet transmitted from a source to a destination and wirelessly routed via the wireless routing node and to compare if such destination address matches a next hop address;
   b) said wireless routing node being configured to perform capture and analysis of the packet only if it is a routing node proximate the destination node and the destination address matches said next hop address; and
   c) wherein said wireless routing node is configured to drop the packet if said analysis determines that said packet is abnormal and to forward the packet to said destination node if said analysis determines that said packet is normal.

12. The wireless routing node for a multi-hop wireless network system of claim 11, wherein said analysis involves intrusion detection, and said wireless routing node is configured to transmit said packet to the destination only if said intrusion detection analysis determines that the packet is normal.

13. The wireless routing node for a multi-hop wireless network system of claim 11, further including a directional antenna.

14. The wireless routing node for a multi-hop wireless network system of claim 13, wherein said node is configured to operate in a promiscuous monitoring mode.

* * * * *